US008452738B2

(12) United States Patent
Mukai (10) Patent No.: US 8,452,738 B2
(45) Date of Patent: May 28, 2013

(54) IMAGING APPARATUS (75) Inventor: Tsutomu Mukai, Osaka (JP)

(73) Assignee: Panasonic Corporation, Osaka (JP)

( * ) Notice: Subject to any disclaimer, the term of this patent is extended or adjusted under 35 U.S.C. 154(b) by 201 days.

(21) Appl. No.: 12/947,058

(22) Filed: Nov. 16, 2010

(65) Prior Publication Data
US 2011/0119238 A1 May 19, 2011

(30) Foreign Application Priority Data

Nov. 18, 2009 (JP) .................................. 2009-262684

(51) Int. Cl.
*G06F 7/00* (2006.01)
*G06F 17/00* (2006.01)
*G06F 17/30* (2006.01)

(52) U.S. Cl.
USPC .......................................................... 707/691

(58) Field of Classification Search
USPC ............................ 707/691; 386/117; 348/220
See application file for complete search history.

(56) References Cited

U.S. PATENT DOCUMENTS

| 6,151,069 | A * | 11/2000 | Dunton et al. ............. 348/220.1 |
| 6,904,229 | B1 | 6/2005 | Suzuki et al. |
| 2004/0197089 | A1 * | 10/2004 | Maeda et al. ................. 386/117 |
| 2006/0158571 | A1 | 7/2006 | Tsunoda et al. |
| 2008/0069522 | A1 * | 3/2008 | Okada et al. .................... 386/95 |
| 2009/0040313 | A1 | 2/2009 | Shioji |
| 2009/0218957 | A1 * | 9/2009 | Kraft et al. .................... 315/291 |

FOREIGN PATENT DOCUMENTS

| JP | 5-61754 | 3/1993 |
| JP | 2001-86450 | 3/2001 |
| JP | 2002-229829 | 8/2002 |
| JP | 2002-244190 | 8/2002 |
| JP | 2003-348511 | 12/2003 |
| JP | 2005-327206 | 11/2005 |
| JP | 2006-203333 | 8/2006 |
| JP | 2006-295656 | 10/2006 |
| JP | 2007-323767 | 12/2007 |
| JP | 2008-59520 | 3/2008 |
| JP | 2009-60602 | 3/2009 |

* cited by examiner

*Primary Examiner* — Jacob F Bétit
*Assistant Examiner* — Christy Lin
(74) *Attorney, Agent, or Firm* — Panasonic Patent Center (57) ABSTRACT

An imaging apparatus is capable of recording a first image file and a second image file which differs from the first image file in a recording format and which needs to be managed by a management file. The imaging apparatus includes an imaging unit that converts a subject optical image into an image signal, a signal processor that creates based on the image signal the first image file, or image data including the second image file and a management file associated with the second image file, and a controller that controls the signal processor. The controller checks consistency between the management file and the second image file, and controls the signal processor such that, when the management file is not consistent with the second image file, creation of the image data is inhibited but creation of the first image file is allowed.

7 Claims, 5 Drawing Sheets

Fig. 5A — ERROR IS DETECTED IN MANAGEMENT FILE.

Fig. 5B — IMPOSSIBLE TO RECOVER AS LACK OF BATTERY

Fig. 5C — IS DATA RECOVERED? [YES] [NO]

Fig. 5D — NOW RECOVERING.

Fig. 5E — COMPLETELY RECOVERED.

IMAGING APPARATUS

BACKGROUND

1. Technical Field

The technical field relates to an imaging apparatus, and more particularly to an imaging apparatus having a recording function of still images and moving images and a recovery function of image data.

2. Related Art

Imaging apparatuses such as digital cameras have been in widespread use in recent years. Image data in various formats, such as still images in JPEG (Joint Photographic Experts Group) format and moving images defined by AVCHD (Advanced Video Codec High Definition) standard, can be recorded in a recording medium such as a memory card.

Meanwhile, an imaging apparatus has a problem of power-off caused by an unexpected accident, such as drop of a battery or come-off of a cable during an AC adapter usage. In this matter, the problem may be more likely to occur in recording of a moving image where a state of recording continues for a certain period of time.

As a prior art document taking into account such a problem, there is JP05-061754A. When a user data file on an external storage device is corrupted due to a power failure, a careless power switch operation, and so on, a contradiction occurs between a management part and a data part of the user data file. A data processing apparatus described in JP05-061754A checks a contradiction between the management part and the data part of each of user data files, detects corruption of the user data file, and makes a user specify a user data file in which the corruption is detected and is to be recovered.

Meanwhile, the AVCHD standard defines that a moving image file in which moving image data is recorded with a management file associated with the moving image file. The management file is a file in which profile information, and the like, of the moving image file is recorded. Hence, the management file is recorded after completing the recording of a moving image file. In the AVCHD standard, in a state in which consistency between the moving image file and the management file is not achieved, a new moving image file may not be able to be recorded because of the standard. To comply with the AVCHD standard, it is a must that a management file associated with a moving image file is always present.

When power shutdown occurs during recording of a moving image according to the AVCHD standard, a situation may occur in which, a management file associated with a moving image is not recorded even though the moving image file has been recorded. In this case, consistency is not ensured between the moving image file and the management file. Hence, for ensuring the consistency, it is necessary to create a management file so as to recover data after power recovery. However, since the creation of the management file requires analysis of the moving image file, it takes much time to recover data.

In cases where it takes much time to recover data, when power shutdown occurs during recording of a moving image, image shooting or recording may not be performed due to data recovery after power recovery. This may cause a user to miss a shooting opportunity, thus reducing user convenience.

SUMMARY

In view of the above-described problem, an imaging apparatus is provided which does not reduce user convenience with respect to image shooting after power recovery even if power shutdown occurs while a moving image is being shot.

In a first aspect, an imaging apparatus is provided which is capable of recording a first image file and a second image file. The second image file differs from the first image file in a recording format and needs to be managed by a management file. The imaging apparatus includes an imaging unit that converts a subject optical image into an image signal, a signal processor that creates based on the image signal the first image file, or image data including the second image file and a management file associated with the second image file, and a controller that controls the signal processor. The controller checks consistency between the management file and the second image file, and controls the signal processor such that, when the management file is not consistent with the second image file, creation of the image data is inhibited but creation of the first image file is allowed.

According to the above-described aspects, the signal processor is controlled such that, when the management file is not consistent with the second image file which composes image data, generation of image data is inhibited but creation of the first image file is allowed. Accordingly even if power shutdown occurs during recording of an image and recovery of image data including the second image file is required, a user can record a first image file immediately after power recovery. Thus, even if power shutdown occurs during recording of an image, user convenience after power recovery is not reduced.

DETAILED DESCRIPTION OF PREFERRED EMBODIMENT

A preferred embodiment will be described with reference to the accompanying drawings.

1. Configuration of Digital Camera

Figure 1A:
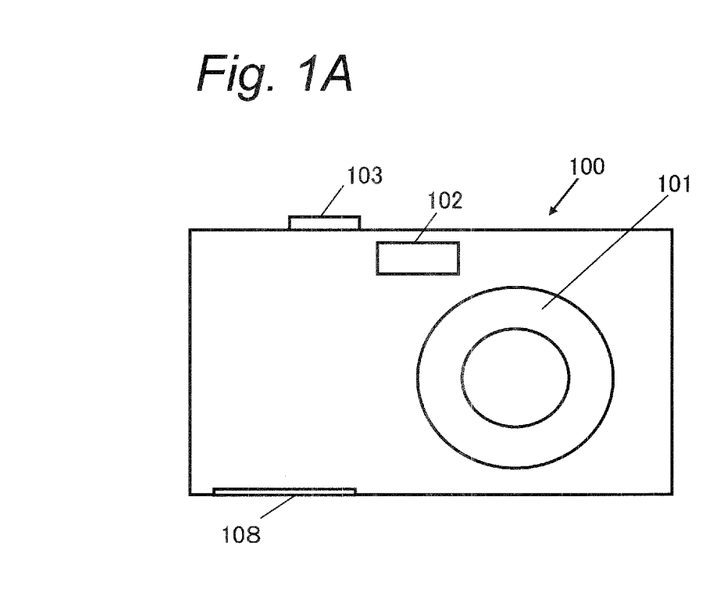
FIGS. 1A and 1B are external views of a digital camera according to an embodiment.
Figure 1B:
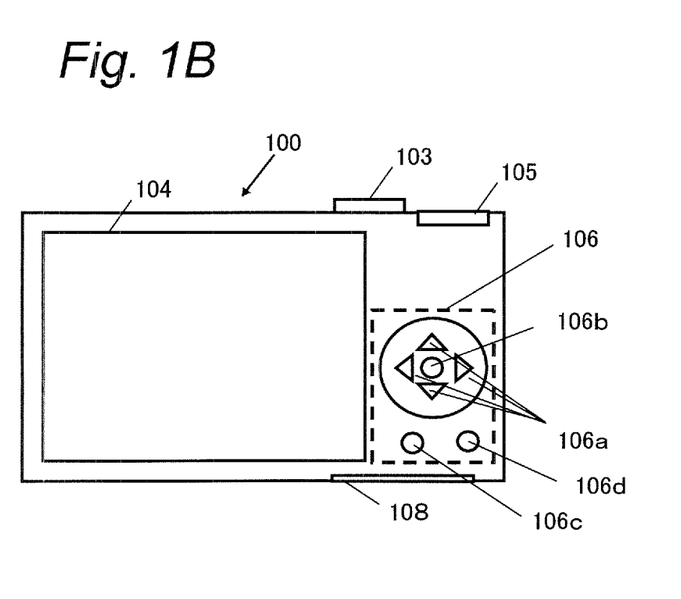

FIGS. 1A and 1B are external views of a digital camera according to an embodiment. FIG. 1A is a front view of a digital camera 100 and FIG. 1B is a rear view of the digital camera 100. The digital camera 100 of the present embodiment can record moving images defined by AVCHD standard and still images defined by DCF (Design rule for Camera File system) standard.

An imaging optical system 101 and a flash 102 are arranged on a front side of the digital camera 100. The imaging optical system 101 forms a subject image on an imaging device in the digital camera 100. In a still image recording mode, when shooting of an image is performed in a dark place, the flash 102 emits flash light to compensate for the shortage of light amount for the shooting.

A shutter button 103 is arranged on a top side of the digital camera 100. In the still image recording mode, when the shutter button 103 is pressed, an electrical signal generated based on an optical image which is formed on the imaging device is recorded as a still image file in a recording medium such as a memory card.

In a moving image recording mode, when the shutter button 103 is pressed, an electrical signal generated based on an optical image formed on the imaging device is sequentially recorded as a moving image file in the recording medium. When the shutter button 103 is pressed again, the recording of the moving image file ends. When the recording ends, if a management file is not present in the recording medium then a management file is newly created in the recording medium, and if a management file is already present in the recording medium then the management file is updated. The management file stores various pieces of information about the moving image file. A combination of a management file and a moving image file is hereinafter referred to as "image data".

In a management file, recording time and profile information of a moving image file, and so on are described. The recording time is information that can not be known until shooting is completed, and thus it is described in the management file after shooting is completed. Specifically, it is common practice that recording time, profile information of the moving image file, and the like are recorded temporally in a work RAM and so on, during the shooting, and they are recoded in the management file after the shooting is completed. Thus, creation of at least a part of the management file is completed after creation of the moving image file is completed. Due to the above-described situation, when power shutdown occurs during the shooting due to an unexpected accident such as drop of a battery or come-off of a cable while an AC adapter is being used, an event may occur in which recording of a management file is not completed while recording of a moving image file is completed. In such a case, the management file is not consistent with the moving image file.

Here, in the AVCHD standard, image data needs to be recorded such that seamless playback can be performed between a plurality of moving image files which are recorded in the same playlist. To conduct seamless playback, when recording an n-th moving image file, there is a need to recognize a state of a decoder buffer, and the like, by referring to a management file for an (n−1)th moving image file which is recorded before the n-th moving image file, and create the n-th moving image file according to the recognized state. As such, when recording an n-th moving image file, a management file for an (n−1)th moving image file is required. Hence, when inconsistency between a management file and a moving image file occurs, a problem that a new moving image cannot be shot occurs.

A slot 108 for allowing a recording medium to be inserted thereinto is arranged on an underside of the digital camera 100. When a still image and a moving image are shot using the digital camera 100, a still image file and a moving image file are stored in different folders in the recording medium. In playback mode, a still image based on a still image file recorded in the recording medium or a moving image based on a moving image file recorded in the recording medium is displayed on a liquid crystal monitor 104.

The liquid crystal monitor 104, a mode dial 105, and various operating buttons 106 are arranged on the rear side of the digital camera 100. In a still image recording mode or a moving image recording mode, an image based on an optical image which is formed on the imaging device is sequentially displayed on the liquid crystal monitor 104. A user can determine a composition for shooting while checking an image displayed on the liquid crystal monitor 104. Also, the liquid crystal monitor 104 can display, in a playback mode, a still image based on a still image file recorded in the recording medium or a moving image based on a moving image file recorded in the recording medium.

The mode dial 105 is a dial type switch for switching among the still image recording mode, the moving image recording mode, and the playback mode. An operating mode of the digital camera 100 can be determined by operating the mode dial 105. The operating modes of the digital camera 100 include the still image recording mode, the moving image recording mode, and the playback mode.

The still image recording mode is an operating mode in which by pressing the shutter button 103 an electrical signal generated based on an optical image which is formed on the imaging device is recorded in the recording medium, as a still image file. The still image recording mode is further separated into a fully automatic recording mode, a program recording mode, a shutter speed priority recording mode, an aperture priority recording mode, and a scene-specific recording mode.

The moving image recording mode is an operating mode in which, during a period of time from when the shutter button 103 is pressed until the shutter button 103 is pressed again, an electrical signal generated based on an optical image which is formed on the imaging device is sequentially recorded in the recording medium, as a moving image file.

The playback mode is an operating mode in which a still image based on a still image file which is recorded in the recording medium or a moving image based on a moving image file which is recorded in the recording medium is displayed on the liquid crystal monitor 104. In addition, thumbnail images of still image files and thumbnail images showing representative images of moving image files can be displayed on the liquid crystal monitor 104 in a mixed manner so as to be arranged in order of recording date and time. By selecting a thumbnail image displayed on the liquid crystal monitor 104, display can be switched. Specifically, when a thumbnail image of a still image file is selected, a still image based on the still image file is displayed on the liquid crystal monitor 104. When a thumbnail image showing a representative image of a moving image file is selected, a moving image based on the moving image file is played back.

The various operating buttons 106 include a menu button 106b for displaying a menu screen on the liquid crystal monitor 104, cursor buttons (up, down, left, and right buttons) 106a for moving a cursor up, down, left, and right to select an item on the menu screen, a set button 106b (which also serves as the menu button) for confirming that an item on which the cursor is present is selected on the menu screen, a display switching button 106c for switching items displayed as OSD (On Screen Display) on the liquid crystal monitor 104 to another, and a delete button 106d for instructing deletion of an unnecessary still image file or moving image file. When a moving image file is deleted, along with the deletion a management file is updated.

By operating these operation button 106, more detailed setting can be made in the still image recording mode, the moving image recording mode, and the playback mode. Specifically, in the still image recording mode, exposure correction, white balance adjustment, settings for light emission of the flash 102, and the like, can be performed. In addition, in the moving image recording mode, resolution and frame rate can be changed. Furthermore, in the playback mode, zoom in or out of a still image displayed on the liquid crystal monitor 104, the setting of the number of thumbnail images displayed simultaneously on the liquid crystal monitor 104, a search for a still image file or a moving image file recorded in the recording medium, and the like, can be performed.

Figure 2:
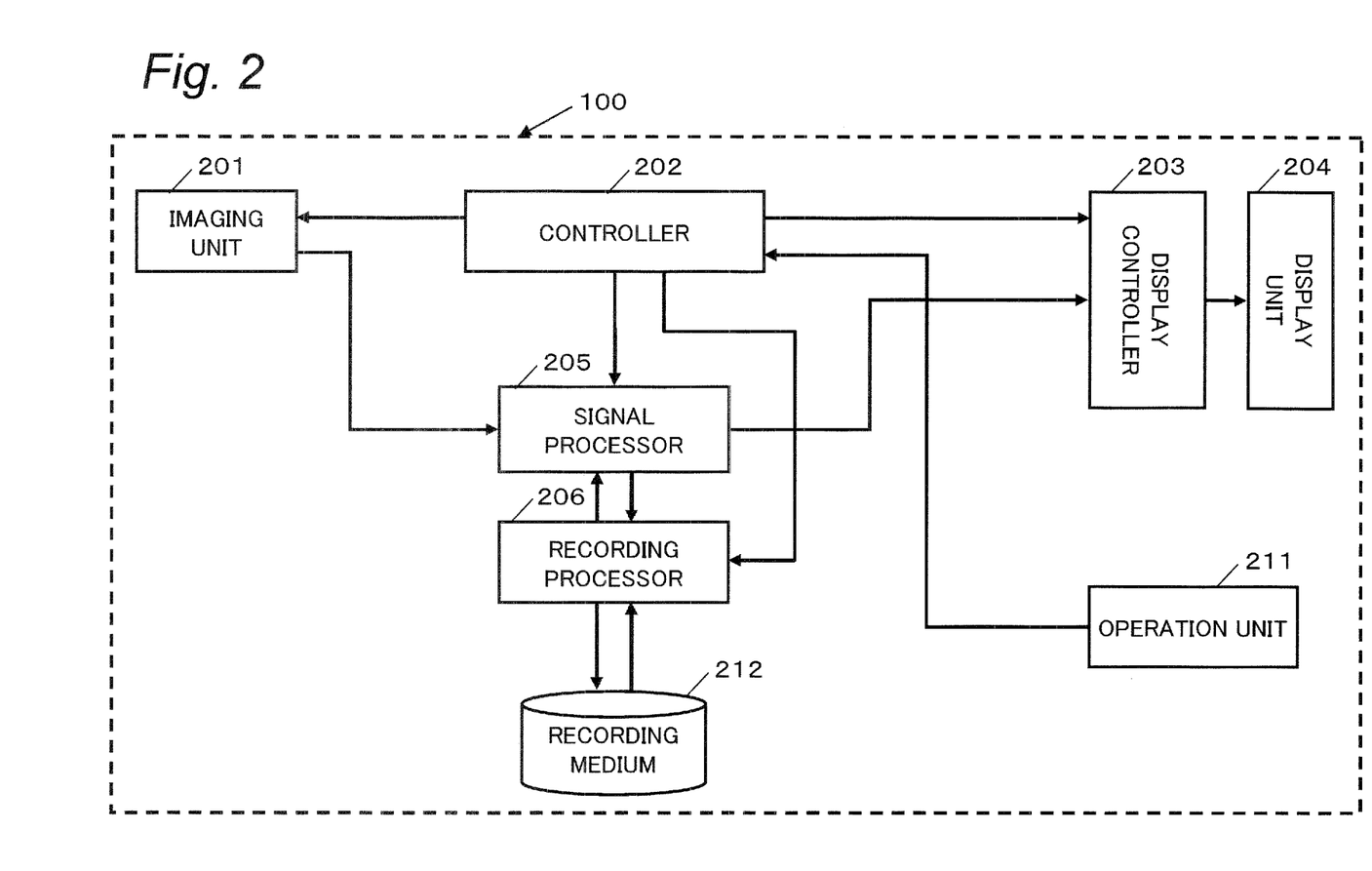
FIG. 2 is a block configuration diagram of the digital camera according to the embodiment.

FIG. 2 is a block configuration diagram of the digital camera 100 of the present embodiment. In the present embodiment, a memory card is adopted as a recording medium 212.

An operation unit 211 includes the shutter button 103, the various operating buttons 106, and the mode dial 105. A user instruction is outputted to a controller 202 through such buttons and a dial.

The controller 202 controls an imaging unit 201, a signal processor 205, a display controller 203, and a recording controller 206 in response to a user instruction outputted from the operation unit 211, to perform processes for capturing, recording, and playback, and the like.

A display unit 204 includes the liquid crystal monitor 104, and displays an image based on an optical image which is formed on the imaging device, a playback image of a still image file or a moving image file recorded in the recording medium 212, a menu screen on which setting for recording and playback are made, and the like. The display controller 203 controls display provided on the display unit 204.

The imaging unit 201 includes an imaging device such as a CCD (Charge Coupled Device), and converts an optical image into an electrical signal in response to an instruction from the controller 202, and outputs the electrical signal to the signal processor 205.

In the still image recording mode, the signal processor 205 performs a compression process, such as JPEG compression, on an electrical signal outputted from the imaging unit 201, and outputs a compressed still image file to the recording controller 206.

In addition, in the moving image recording mode, the signal processor 205 performs a compression process, such as MPEG (Moving Picture Experts Group) compression, on an electrical signal which is sequentially outputted from the imaging unit 201, and outputs a compressed moving image file to the recording controller 206.

Furthermore, in the still image recording mode and the moving image recording mode, the signal processor 205 converts an electrical signal which is sequentially outputted from the imaging unit 201, into a signal which can be displayed on the display unit 204, such as a YC signal, and outputs the signal to the display controller 203.

In addition, in the playback mode, the signal processor 205 decompresses a still image file in the recording medium 212 which is outputted from the recording controller 206, and outputs the decompressed still image file to the display controller 203. Also, the signal processor 205 decompresses a moving image file in the recording medium 212 which is outputted from the recording controller 206, and outputs the decompressed moving image file to the display controller 203.

The recording controller 206 records a still image file or a moving image file outputted from the signal processor 205, in the recording medium 212. In addition, according to an instruction from the controller 202, the recording controller 206 reads a still image file or a moving image file from the recording medium 212 and outputs the still image file or the moving image file to the signal processor 205. Furthermore, according to an instruction from the controller 202, the recording controller 206 reads a management file in the recording medium 212 and outputs the management file to the controller 202.

2. Folder Structure

Figure 3:
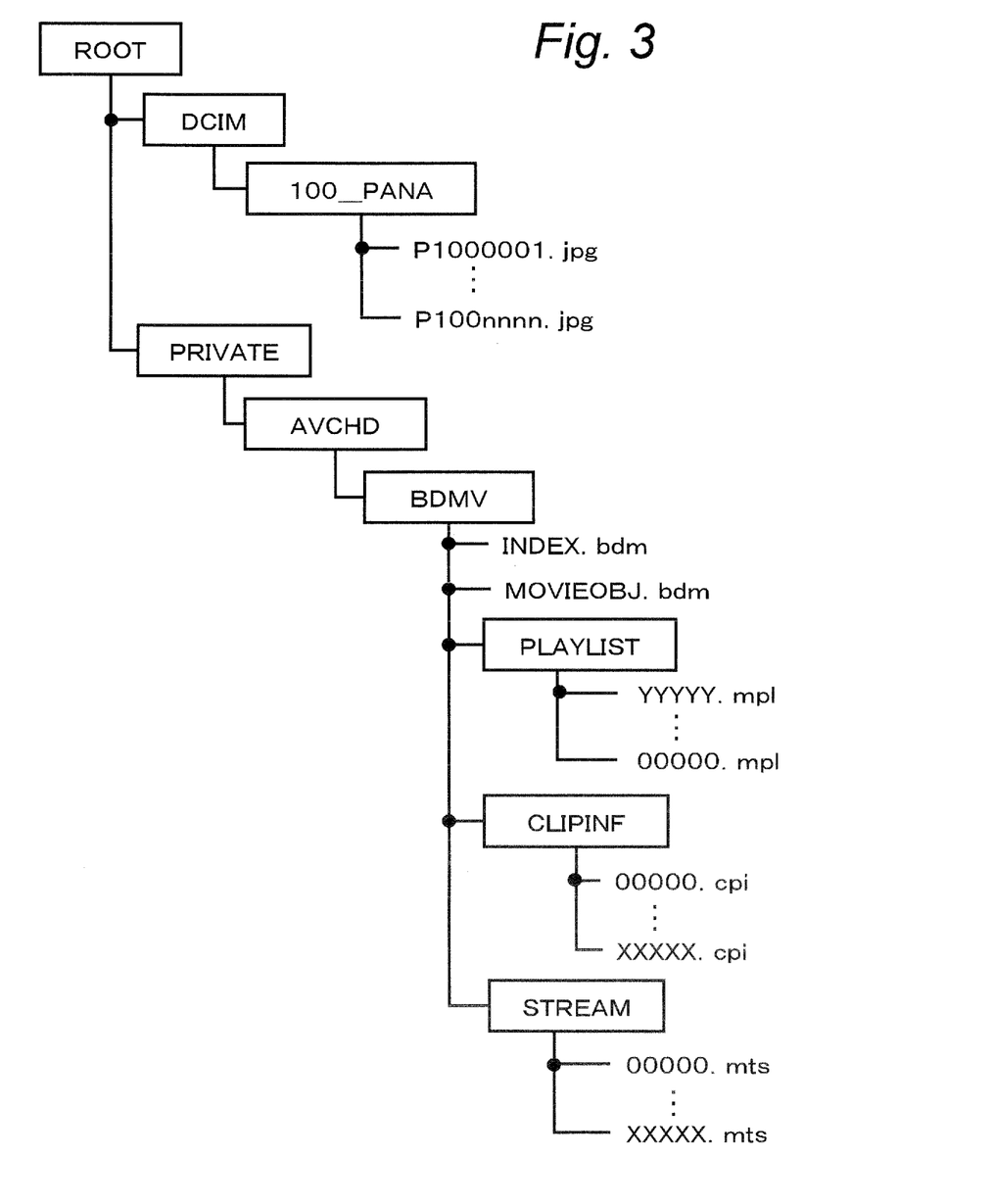
FIG. 3 is a diagram showing a folder structure in a recording medium.

FIG. 3 is a diagram showing a folder structure in the recording medium 212. A folder name is enclosed in a box but a file name is not enclosed in a box. Below a ROOT folder, a DCIM folder and a PRIVATE folder are created.

The DCIM folder is a folder defined by the DCF standard. Below the DCIM folder, a 100_PANA folder is created. The 100_PANA folder is a folder named based on the DCF standard, and stores still image files. In FIG. 3, files of P1000001.jpg to P100nnnn.jpg are still image files named based on the DCF standard. In this example, management files associated with still image files are not present. A still image file is an example of a first image file.

Below the PRIVATE folder, an AVCHD folder is created. Below the AVCHD folder, a BDMV folder is created. Files stored in the BDMV folder and files stored in folders below the BDMV folder are examples of files composing image data.

Below the BDMV folder, a STREAM folder is created. The STREAM folder stores moving image files. In FIG. 3, files of 00000.mts to XXXXX.mts are moving image files. A moving image file is an example of a second image file.

Files stored immediately below the BDMV folder, and files which are stored in folders below the BDMV folder and are other than moving image files stored in the STREAM folder are examples of management files.

As an example of the management file, a clip information file stored in a CLIPINF folder will be described. Below the BDMV folder, the CLIPINF folder is created. The CLIPINF folder stores clip information files (files whose filename extensions are cpi). Specifically, files of 00000.cpi to XXXXX.cpi are clip information files. The clip information file is provided correspondingly to the moving image file, and stores information on the recording time of a moving image file corresponding thereto, and the like. For example, the clip information files of 00000.cpi and XXXXX.cpi correspond to the moving image files 00000.mts and XXXXX.mts, respectively.

Description about an INDEX.bdm file and a MOVIEOBJ.bdm file which are stored in the BDMV folder, and thus files of 00000.mpl to YYYYY.mpl which are stored in a PLAYLIST folder is omitted.

3. Operations

Figure 4:
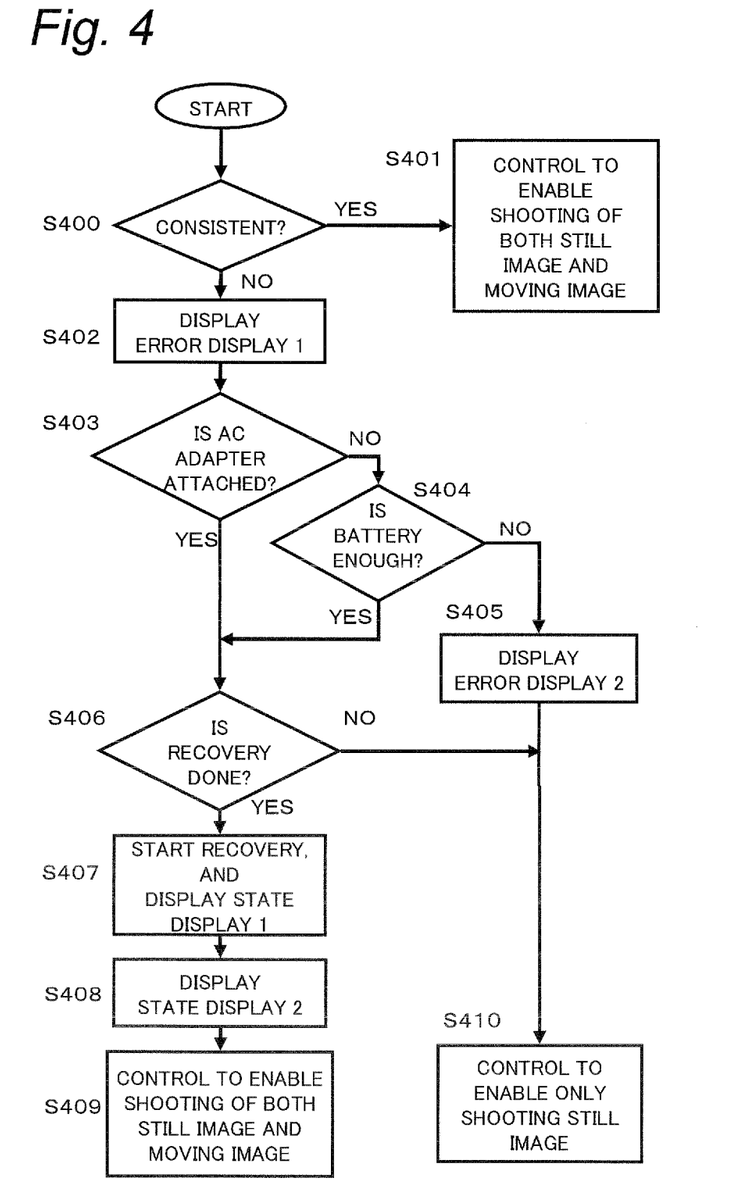
FIG. 4 is a flowchart showing an operation of the digital camera according to the embodiment in connection with a check of consistency between moving image files and management files.

FIG. 4 is a flowchart showing operations of the digital camera 100. According to the present embodiment, when the digital camera 100 is activated in a moving image recording mode, the digital camera 100 checks consistency between management files and moving image files (S400). Here, the management files include files stored directly in the BDMV folder, and files which are stored in folders below the BDMV folder and are other than moving image files stored in the STREAM folder. The moving image files include moving image files stored in the STREAM folder.

According to an instruction from the controller 202, the recording controller 206 reads management files in the recording medium 212 and outputs the management files to the controller 202. The controller 202 checks whether all of the management files comply with the AVCHD standard and whether there is no missing information to be described in the management files. As an example of the check, a check of clip information files stored in the CLIPINF folder will be described. The clip information files correspond to moving image files, respectively. If a clip information file corresponding to a moving image file is not present, then the controller 202 determines that the management file is not consistent with the moving image file. For example, if the moving image file 00000.mts corresponding to the clip information file 00000.cpi is not present, then the controller 202 determines that the management file is not consistent with the moving image file.

Figure 5A:
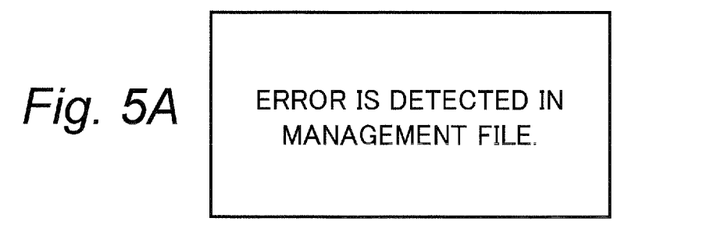
FIGS. 5A to 5E are diagrams showing examples of error display and state display.

If the management files are consistent with the moving image files, then the digital camera 100 is controlled to be in a state of being able to shoot or record both still image and moving image (S401). The controller 202 controls the signal processor 205 to allow generation/creation of image data (moving image files and management files) and still image files. On the other hand, if the management files are consistent with the moving image files, then the controller 202 controls the display unit 204 to display an error display 1 (S402). For example, as the error display 1, an image such as that shown in FIG. 5A is displayed on the display unit 204.

Subsequently, the controller 202 checks the power to the digital camera 100. This is because, when there is consistency between the management files and the moving image files, it requires a certain amount of time and electric power to recover the management files.

First, the controller 202 checks whether an AC adapter is attached to the digital camera 100 (S403). Whether an AC adapter is attached thereto can be determined by observing a reduction trend of supply voltage on temporarily applying a load to the power. Alternatively, a mechanical detector may be provided to detect attachment of an AC adapter.

If an AC adapter is attached to the digital camera 100, electric power is supplied stably, and thus the controller 202 terminates the check of the power. If an AC adapter is not attached to the digital camera 100, then the remaining amount of a battery is checked (S404). The remaining amount of the battery can be determined in the same manner as that for the check of the AC adapter attachment, i.e., by observing a reduction trend of supply voltage on temporarily applying a load to the power. Therefore, a check of the attachment of an AC adapter and a check of the remaining amount of battery may be simultaneously performed.

Figure 5B:
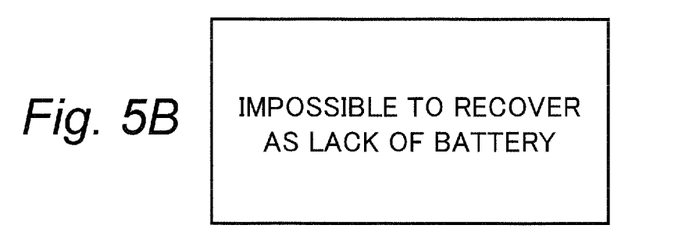

If the remaining amount of the battery does not fulfill electric power required to achieve consistency between the management files and the moving image files, then the controller 202 controls the display unit 204 to display error display 2 (S405). For example, as error display 2, an image such as that shown in FIG. 5B is displayed on the display unit 204.

However, even in such a case, in the digital camera 100 according to the present embodiment, the controller 202 controls the digital camera 100 to be in a state of being able to shoot or record only a still image (S410). Namely, the controller 202 controls the signal processor 205 such that generation of image data is inhibited but creation of a still image file is allowed. Therefore, even if the remaining amount of battery does not fulfill electric power required to achieve consistency between the management files and the moving image files and thus the consistency cannot be achieved, only a still image can be recorded or shot so that user convenience is improved. Note that needless to say, even if consistency between the management files and the moving image files cannot be achieved, it is desirable to control so as to perform afterward recovery to achieve consistency between the management files and the moving image files by attaching an AC adapter thereto or charging the battery.

Figure 5C:
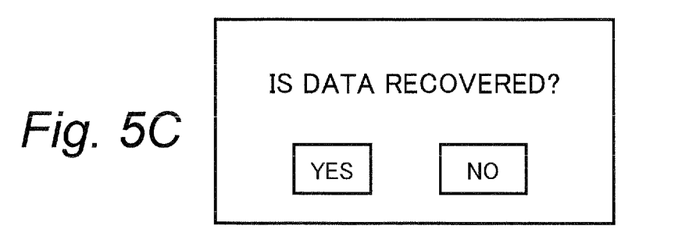

If the remaining amount of the battery exceeds electric power required to achieve consistency between the management files and the moving image files, then the controller 202 confirms with the user whether to perform recovery to achieve consistency between the management files and the moving image files (S406). To do so, the controller 202 allows the display unit 204 to display an inquiry screen as shown in FIG. 5C.

If the user selects not to perform recovery to achieve consistency between the management files and the moving image files in order not to miss a shooting opportunity (NO at S406), then in the present embodiment the controller 202 controls the digital camera 100 to be in a state of being able to record only a still image (S410). Therefore, even if recovery to achieve consistency between the management files and the moving image files is not performed, the user can shoot only a still image immediately, and thus the user does not miss a shooting opportunity and thus user convenience improves. Note that needless to say, even if the user selects not to perform recovery to achieve consistency between the management files and the moving image files in order not to miss a shooting opportunity, it is desirable to control so as to perform recovery to achieve consistency between management files and moving image files afterward.

Figure 5D:
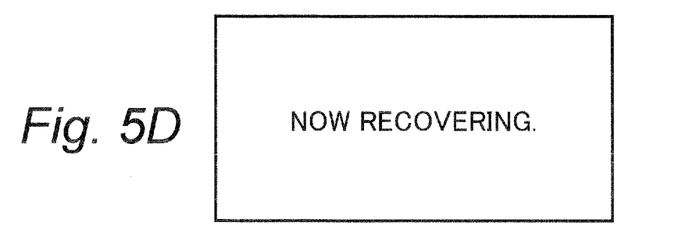

On the other hand, if the user selects to perform recovery so as to achieve consistency between the management files and the moving image files (YES at S406), then the controller 202 starts recovery to achieve consistency between management files and moving image files. At the same time, the controller 202 allows the display unit 204 to display state display 1 as shown in FIG. 5D (S407).

Recovery to achieve consistency between the management files and the moving image files requires a certain amount of time. As an example, recovery of a clip information file stored in the CLIPINF folder is shown. In a clip information file, information on recording time of a moving image file corresponding thereto, and the like, is described. Therefore, to recover the clip information file, it is needed to internally play back the moving image file corresponding thereto without displaying the moving image file on the display unit 204 to check recording time thereof, and describe the checked recording time in the clip information file. Since such a process takes place, recovery to achieve consistency between the management files and the moving image files requires a certain amount of time and electric power.

Figure 5E:
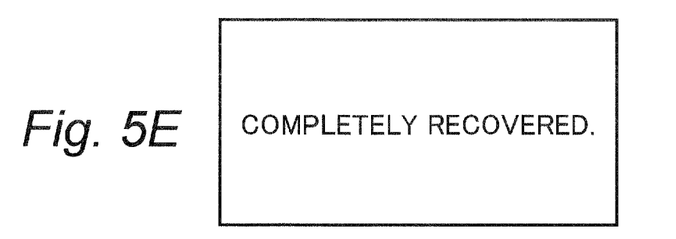

When recovery to achieve consistency between the management files and the moving image files is completed, the controller 202 controls the display unit 204 to display a state display 2 (S408). For example, an image as shown in FIG. 5E is displayed on the display unit 204. Thereafter, the digital camera 100 is controlled to be in a state of being able to shoot or record both still image and moving image (S409).

4. Others

In the above-described embodiment, the following variations and modifications may also be considered.

(1) According to the present embodiment, when the digital camera 100 is activated in a moving image recording mode, consistency between the management files and the moving image files is checked (S400 in FIG. 4). However, consistency between the management files and the moving image files may be checked (i.e., the process shown in FIG. 4 may be performed) not only when the digital camera 100 is activated in moving image recording mode but also when the digital camera 100 transitions to moving image recording mode from the other operating mode. Alternatively, consistency between the management files and the moving image files may also be checked (i.e., the process shown in FIG. 4 may be performed) when a recording medium is changed. Alternatively, consistency between the management files and the moving image files may also be checked when the digital camera 100 is activated in the still image recording mode. Namely, when the digital camera 100 is turned on, a check of consistency between the management files and the moving image files, i.e., the process shown in the flowchart in FIG. 4, may be performed.

When the digital camera 100 is activated in the playback mode, a moving image cannot be played back unless there is consistency between the management file and the moving image file, and therefore recovery to achieve consistency between the management file and the moving image file is required to play back a moving image, but the recovery is not required to display a still image. Hence, when the digital camera 100 is activated in the playback mode, consistency between the management file and moving image file may always be checked. Alternatively, consistency between the management file and the moving image file may not be checked when a still image is displayed while it may be checked immediately before playing back a moving image. By this configuration, even if the management files are not consistent with the moving image files due to power shutdown, the user can still browse a still image. Accordingly, it can be expected to reduce interruption of user's shooting and browsing of still images.

Meanwhile, an imaging apparatus having only recording mode and playback mode is known. Such an imaging apparatus is often provided with a dedicated button for shooting of a moving image, in addition to a shutter button for shooting of a still image. In such an imaging apparatus, consistency between the management files and the moving image files may be checked when the imaging apparatus is activated in the recording mode or when the imaging apparatus transitions from the playback mode to the recording mode. In the case where recovery to achieve consistency between the management files and the moving image files has not been performed, when the dedicated button for shooting of a moving image is pressed, an error display indicating that moving images cannot be recorded may be displayed on the display unit 204 to urge the user to perform recovery so as to achieve consistency between the management files and the moving image files.

(2) The digital camera 100 according to the above-described embodiment can record moving images defined by the AVCHD standard and still images defined by the DOE standard. However, the format for recording of moving images is not limited to the AVCHD standard. For the format for recording of moving images, for example, there is Motion JPEG format. A moving image file in Motion JPEG format is not accompanied by a management file. Therefore, the digital camera 100 can handle moving images in Motion JPEG format in the same manner as that for still images. Specifically, even when recovery to achieve consistency between the management files and the moving image files is not performed, the digital camera 100 may allow recording of moving images in Motion JPEG format as well as still images at step S410. Accordingly the user does not miss a shooting opportunity and can shoot moving images in Motion JPEG format so that user's convenience improves.

There also may be a case in which a still image file is accompanied by a management file. For example, there may be a case in which there is a management file that manages a still image file obtained by continuous recording or bracket recording. In such a case, control may be performed such that, when the management files are not consistent with the still image files, while continuous recording and bracket recording may be inhibited, single recording and moving image recording may be allowed. In a word, the idea of the present embodiment is that, in the case where there is no consistency between the management files and the image files, recording operation that cannot be performed subsequently or causes trouble due to the inconsistency between the management files and the image files is inhibited, while recording operation that is not affected by the inconsistency is allowed.

(3) In the recovery to achieve consistency between the management files and the moving image files, the description is focused on the case of recovering a management file. However, there may be a case in which a moving image file needs to be recovered. An example thereof includes a case in which a moving image file requires EOS (End Of Stream) information indicating an end thereof. In this case, if a moving image file does not have EOS information, then recovery is performed to describe EOS information in the moving image file. Another example thereof includes a case in which thumbnail information is missing. In such a case, too, thumbnail information needs to be newly generated by recovery.

(4) The above-described example describes the control of recording operations of still images and moving images when there is no consistency between the management files and the moving image files. When there is no consistency between the management files and the moving image files, playback operations of still images and moving images may be controlled in the same manner as that for the recording operations of still images and moving images. Specifically, control may be performed such that, when there is no consistency between the management files and the moving image files, playback of still image files is allowed but playback of those moving image files that do not have consistency with management files is inhibited.

5. Summary

As described above, the digital camera 100 according to the present embodiment is an imaging apparatus capable of recording a still image file and a moving image file which differs from the still image file in recording format and which needs to be managed by a management file. The digital camera 100 includes the imaging unit 201 that converts a subject optical image into an image signal; the signal processor 205 that creates, based on the image signal, a still image file or image data composed of a moving image file and a management file associated with the moving image file; and the controller 202 that controls the signal processor 205. The controller 202 checks consistency between the management file and the moving image file and controls the signal processor 205 such that, when consistency between the management file and the moving image file is not achieved, generation of image data is inhibited but creation of a still image file is allowed.

By this configuration, even if power shutdown occurs due to an unexpected accident such as drop of a battery or come-off of a cable when an AC adapter is used, a situation in which the digital camera cannot perform any recording does not occur. In addition, immediately after power recovery, instead of automatically performing a recovery process to achieve consistency between a management file and a moving image file, the digital camera 100 may confirm with the user whether the recovery process is required. This enables the user to shoot still images (or moving images which are not accompanied by management files, such as moving images in Motion JPEG format) immediately after power recovery. Then, by performing recovery to achieve consistency between a management file and a moving image file afterward, moving image recording can also be performed. Accordingly, an imaging apparatus can be provided that can prevent the user from missing a shooting opportunity and improve user's convenience.

Although a specific embodiment has been described above, many other variants and modifications and other uses will become apparent to those skilled in the art. Therefore, the present invention is not limited to the specific disclosure herein and will be limited only by the appended claims.

INDUSTRIAL APPLICABILITY

In the present embodiment, after power recovery, even if there is inconsistency between a management file and a second image file (e.g., a moving image file), a first image file (e.g., a still image file) can be created immediately. Thus, the present embodiment can be applied to imaging apparatuses having a still image and moving image recording function and an image data recovery function, such as digital cameras and digital video cameras.

What is claimed is:

1. An imaging apparatus capable of recording a still image file and a moving image file which differs from the still image file in a recording format and which needs to be managed by a management file, the imaging apparatus comprising:
    an imaging unit that converts a subject optical image into an image signal;
    a signal processor that creates based on the image signal the still image file, or image data including the moving image file and a management file associated with the moving image file; and
    a controller that controls the signal processor,
        wherein in response to the imaging apparatus activating or transiting to a mode for recording the moving image, the controller checks consistency between the management file and the moving image file, and
        in response to the management file not being consistent with the moving image file, the controller controls the signal processor to inhibit creation of the image data but to allow creation of the still image file.

2. The imaging apparatus according to claim 1, wherein creation of at least a part of the management file is completed after creation of the moving image file is completed.

3. The imaging apparatus according to claim 1, wherein the still image file is a file created in compliance with Design rule for Camera File system (DCF) standard, and the moving image file is a file created in compliance with Advanced Video Codec High Definition (AVCHD) standard.

4. The imaging apparatus according to claim 1, wherein, when power shutdown of the imaging apparatus occurs during creation of the image data, the controller checks consistency between the management file and the moving image file when power is recovered.

5. The imaging apparatus according to claim 1, further comprising a display unit, wherein
    when the management file is not consistent with the moving image file, the controller displays an image confirming with a user whether recovery of the image data is required on the display unit.

6. The imaging apparatus according to claim 1, further comprising a slot for allowing a removable recording medium to be inserted therein, wherein
    when the recording medium is newly inserted in the slot, the controller checks consistency between the management file and the moving image file.

7. The imaging apparatus according to claim 1, wherein the still image file and the moving image file are recorded in same recording medium.

* * * * *